(12) United States Patent
Urase et al.

(10) Patent No.: US 8,943,893 B2
(45) Date of Patent: Feb. 3, 2015

(54) ULTRASONIC SENSOR

(75) Inventors: Hiroshi Urase, Aichi (JP); Yasusi Nagano, Mie (JP); Naoya Azuma, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 457 days.

(21) Appl. No.: 13/391,089

(22) PCT Filed: Aug. 17, 2010

(86) PCT No.: PCT/IB2010/002019
§ 371 (c)(1),
(2), (4) Date: Mar. 23, 2012

(87) PCT Pub. No.: WO2011/021086
PCT Pub. Date: Feb. 24, 2011

(65) Prior Publication Data
US 2012/0167689 A1  Jul. 5, 2012

(30) Foreign Application Priority Data

Aug. 18, 2009  (JP) .................................. 2009-189408

(51) Int. Cl.
*G01S 15/93* (2006.01)
*G10K 11/02* (2006.01)
*G01S 7/521* (2006.01)
*G10K 9/122* (2006.01)
*B60R 19/48* (2006.01)

(52) U.S. Cl.
CPC ................ *G10K 11/02* (2013.01); *G01S 7/521* (2013.01); *G10K 9/122* (2013.01); *B60R 19/483* (2013.01); *G01S 15/931* (2013.01); *G01S 2015/938* (2013.01)
USPC ................................ 73/632; 367/99; 340/435

(58) Field of Classification Search
USPC ................................ 73/632; 340/435; 367/99
See application file for complete search history.

(56) References Cited

U.S. PATENT DOCUMENTS

2005/0242933 A1* 11/2005 Loh ............................... 340/435

FOREIGN PATENT DOCUMENTS

| JP | 64-85000 | 3/1989 |
|---|---|---|
| JP | 3-43635 | 2/1991 |
| JP | 4-245898 | 9/1992 |
| JP | 08-065795 | 3/1996 |
| JP | 2651140 | 5/1997 |
| JP | 10-070784 | 3/1998 |
| JP | 2003163995 | 6/2003 |

OTHER PUBLICATIONS

English Translation of JP 10-070784 obtained Jul. 17, 2014.*

* cited by examiner

*Primary Examiner* — John Chapman, Jr.
(74) *Attorney, Agent, or Firm* — Bacon & Thomas, PLLC

(57) ABSTRACT

An ultrasonic sensor is provided at a bumper 31 of a vehicle 3 and used in a vehicle obstacle detector 1 that detects the presence of an obstacle within a detection area by transmitting and receiving ultrasonic waves. The ultrasonic sensor includes a piezoelectric element 21 configured to transmit and receive the ultrasonic waves by using vibrations of a piezoelectric substrate and a plate-shaped acoustic matching layer 22 on one surface 22a of which the piezoelectric element is attached. The ultrasonic sensor is inserted in a mounting hole formed through the mounting surface. Another surface 22b of the acoustic matching layer 22 opposite to the one surface 22a is inclined with respect to the one surface 22a on which the piezoelectric element is attached, and is formed to be parallel with the outer surface of the bumper 31.

4 Claims, 18 Drawing Sheets

ULTRASONIC SENSOR

FIELD OF THE INVENTION

The present invention relates to an ultrasonic sensor for use in a vehicle obstacle detector that detects objects using ultrasonic waves.

BACKGROUND OF THE INVENTION

An ultrasonic sensor is used in a vehicle obstacle detector that is installed in a bumper of a vehicle and detects an obstacle by intermittently transmitting ultrasonic waves from an ultrasonic microphone and receiving reflected waves from the obstacle present within a detection area. Furthermore, an ultrasonic sensor has the characteristics of being able to limit the detection area thereof and to measure the distance. However, since ultrasonic waves have wide directivity, a system that is used in a detection area of a maximum distance of 2 m is commonly used. However, a vehicle obstacle detector has required an ultrasonic sensor having a long-distance detection area.

FIGS. 8A and 8B illustrate the schematic configuration of a vehicle obstacle detector 1 having an ultrasonic sensor 11' and detection areas. FIG. 8A is a plan view of a vehicle 3, and illustrates the block configuration of a vehicle obstacle detector 1 and the horizontal detection areas Ah of the vehicle 3. FIG. 8B is a side view of the vehicle 3, and illustrates the vertical detection area Av of the vehicle 3.

The vehicle obstacle detector 1 includes the ultrasonic sensor 11', a controller unit 12, and a display unit 13. The ultrasonic sensor 11' includes ultrasonic microphones 2', and the ultrasonic microphones 2' are provided at both side portions of a bumper 31 on the rear of a vehicle 3. The display unit 13 notifies a user of the presence of an obstacle within the detection area using a buzzer or LEDs. The controller unit 12 monitors and controls ultrasonic waves transmitted and received by the ultrasonic sensor 11', and outputs the results of the detection to the display unit 13.

The operation of the vehicle obstacle detector 1 will now be described. First, the controller unit 12 intermittently generates an ultrasonic wave pulse signal and outputs it to the ultrasonic sensor 11'. The ultrasonic sensor 11' amplifies the ultrasonic wave pulse signal, and the ultrasonic microphone 2' transmits ultrasonic waves. Furthermore, when an obstacle is present in the detection area, the ultrasonic microphone 2' receives reflected waves from the obstacle, and the ultrasonic sensor 11' amplifies the received ultrasonic wave pulse signal and outputs it to the controller unit 12. Furthermore, the controller unit 12 calculates a distance to the obstacle based on the difference between the time at which the ultrasonic waves were transmitted and the time at which the reflected waves were received. If the obstacle is present within predetermined range, the controller unit 12 outputs detection signal to the display unit 13, and the display unit 13 notifies a user of the presence of the obstacle.

According to the principle by which ultrasonic waves are utilized, the detection area varies depending on the obstacle, that is, an object to be detected. The detection areas shown in FIGS. 8A and 8B are detection areas when a plastic column having an outer diameter of 60 mm (not shown) is assumed to be the object to be detected.

Next, the ultrasonic microphone 2' that transmits and receives ultrasonic waves will be described. An ultrasonic microphone 2' using a piezoelectric element 21 based on diffused vibration mode has been proposed (for example, see Patent document 1).

FIGS. 9A to 9C illustrate the schematic configuration of the ultrasonic microphone 2'. FIG. 9A is a plan view of the ultrasonic microphone 2', FIG. 9B is a sectional view showing section A-A' of the ultrasonic microphone 2', and FIG. 9C is a sectional view showing section B-B' of the ultrasonic microphone 2'.

The ultrasonic microphone 2' includes a piezoelectric element 21, an acoustic matching layer 22, a vibration casing 23, a connector 25, and a filler 26. The piezoelectric element 21 is configured in the form of a plate in which a piezoelectric substrate (not shown) makes diffused vibrations. The acoustic matching layer 22 has a plate shape, the opposite surfaces 22a and 22b thereof are formed to be parallel, and the piezoelectric element 21 is attached to one surface 22a of the acoustic matching layer 22. The acoustic matching layer 22 suppresses a reflection occurring on a boundary surface due to the difference between the sound impedance of the piezoelectric element 21 and the sound impedance of air, and increases the efficiency of transmission and reception of ultrasonic waves. Furthermore, the ring-shaped vibration casing 23 is attached to the periphery of one surface 22a of the acoustic matching layer 22 to surround the piezoelectric element 21, and supports the acoustic matching layer 22. Furthermore, lead wires 24a and 24b are extended from one surface 21a and the opposite surface 21b of the piezoelectric element 21, respectively, and are connected to the connector 25. Furthermore, the inside of the vibration casing 23 is filled with the filler 26, and the piezoelectric element 21 is sealed.

In the above configuration, when an ultrasonic wave pulse signal is input through the connector 25, the piezoelectric element 21 vibrates, and ultrasonic waves are output from the opposite surface 22b of the acoustic matching layer 22 via the acoustic matching layer 22. Furthermore, the ultrasonic waves are transmitted in a direction that is perpendicular to one surface 21a of the piezoelectric element 21 that is attached to the acoustic matching layer 22. Furthermore, the piezoelectric element 21 may be a piezoelectric element that uses a thickness vibration mode.

FIGS. 10A to 10C are diagrams illustrating the schematic configuration of the ultrasonic sensor 11' using the ultrasonic microphone 2'. FIG. 10A is a plan view of the ultrasonic sensor 11', FIG. 10B is a sectional view of section A-A' of the ultrasonic sensor 11', and FIG. 10C is a sectional view of section B-B' of the ultrasonic sensor 11'. The ultrasonic sensor 11' includes a holding rubber 111 for securing the ultrasonic microphone 2'; an electronic circuit unit 112 for amplifying ultrasonic wave pulse signals output from the controller unit 12 and the ultrasonic microphone 2'; a housing 113 configured to accommodate the ultrasonic microphone 2', the holding rubber 111 and the electronic circuit unit 112 and to be fitted into the mounting hole 31a of the bumper 31 of the vehicle 3; a signal line 114 for connecting the electronic circuit unit 112 and the controller unit 12; and a connector 115.

The holding rubber 111 is formed in a cylindrical shape having a bottom, and the ultrasonic microphone 2' is inserted into the holding rubber 111, so that the outer surface of the ultrasonic microphone 2' comes into contact with the inner surface of the holding rubber 111. Accordingly, the holding rubber 111 holds the ultrasonic microphone 2'.

The electronic circuit unit 112 amplifies the ultrasonic wave pulse signal output from the controller unit via the signal line 114 and the connector 115. The amplified ultrasonic wave pulse signal is then output to the piezoelectric element 21 via the connector 25 and the lead wires 24a and 24B, so that ultrasonic waves can be transmitted from the piezoelectric element 21. Furthermore, when an obstacle is present in the detection area, the piezoelectric element 21 receives ultrasonic waves reflected from the obstacle, and the electronic circuit unit 112 amplifies the received ultrasonic wave pulse signal and outputs it to the controller unit 12. Furthermore, the controller unit 12 calculates the distance to the obstacle based on the difference between the time at which the ultrasonic waves were transmitted and the time at which the ultrasonic waves were received.

The housing 113 includes a cylindrical rear housing part 113a, a substantially cylindrical front housing part 113b extending from one surface of the rear housing part 113a, and a flange part 113c protruding around the opening of the front housing part 113b. The cylindrical rear housing part 113a accommodates the electronic circuit unit 112 therein. The holding rubber 111 holding the ultrasonic microphone 2' is fitted into the front housing part 113b, and the front housing part 113b accommodates the holding rubber 111 in such a manner that the outer surface of the holding rubber 111 comes into contact with the inner surface of the front housing part 113b. The flange part 113c is formed to protrude from the periphery of the opening of the front housing part 113b in the outward radial direction. Furthermore, the front surface 11a of the ultrasonic sensor 11, which is formed by the flange part 113c of the housing 113, the periphery of the opening of the holding rubber 111, and the opposite surface 22b of the acoustic matching layer 22 of the ultrasonic microphone 2', forms a single smooth surface.

The mounting hole 31a is formed through the bumper 31 so that the outside and the inside of the bumper 31 communicate with each other. The diameter of the mounting hole 31a is substantially the same as the outside diameter of the rear housing part 113a and the front housing part 113b. Furthermore, the ultrasonic sensor 11' is inserted into the mounting hole 31a from the outside of the bumper 31, and the ultrasonic sensor 11' is held on the bumper 31 by the flange part 113c of the housing 113. As a result, only the flange part 113c of the ultrasonic sensor 11' protrudes from the outside surface of the bumper 31. The flange part 113c is formed to be thin, and the front surface 11a of the ultrasonic sensor 11' and the outside surface of the bumper 31 are formed to be parallel.

In the above configuration, when an ultrasonic wave pulse signal is intermittently output from the controller unit 12 to the electronic circuit unit 112, the electronic circuit unit 112 amplifies the ultrasonic wave pulse signal and outputs it to the ultrasonic microphone 2'. Furthermore, the piezoelectric element 21 of the ultrasonic microphone 2' vibrates, and ultrasonic waves are transmitted from the opposite surface 22b of the acoustic matching layer 22. The direction in which ultrasonic waves are transmitted is the direction perpendicular to one surface 21a of the piezoelectric element 21. That is, ultrasonic waves are transmitted in the direction perpendicular to the outside surface of the bumper 31. Furthermore, when an obstacle is present in a detection area, the ultrasonic microphone 2' receives waves reflected from the obstacle, and the electronic circuit unit 112 amplifies the ultrasonic wave pulse signal and outputs it to the controller unit 12. The controller unit 12 calculates the distance to the obstacle based on the difference between the time at which the ultrasonic waves were transmitted and the time at which the reflected waves were received. If the obstacle is within a predetermined distance, the controller unit 12 outputs a detection signal to the display unit 13, and the display unit 13 notifies a user of the presence of the obstacle.

Next, the detection area within which the ultrasonic sensor 11' can detect the presence of an obstacle will be described. The detection area is determined by the transmission direction and orientation angle of ultrasonic waves and the detection distance. In FIG. 8A, if the detection area Ah in the horizontal direction of the vehicle 3 includes an area outside of the width 3a of the vehicle 3, an obstacle that would not collide with the vehicle 3 may be detected, and therefore the defect of providing an unnecessary notification to the user may occur. Furthermore, in FIG. 8B, if the detection area Av in the vertical direction of the vehicle 3 includes a road surface, the defect of detecting the road surface as an obstacle may occur.

Accordingly, an ultrasonic sensor arrangement has been proposed in which three ultrasonic sensors 11' are provided at substantially equal intervals and the detection distance of the ultrasonic sensor 11' at the center of the arrangement is set to a value that is longer than that of the ultrasonic sensors 11' at both sides thereof, so that an area outside of the width 3a of the vehicle 3 is not detected (for example, see Patent document 2). In light of the characteristic in which the detection area of such an ultrasonic sensor 11' is narrow for a short distance and wide for a long distance, the ultrasonic sensors 11' with a short detection distance provided on both sides are made to cover only short-distance areas, and ultrasonic sensor 11' with a long detection distance provided at the center is made to cover a long-distance area. Accordingly, the short-distance areas within the width 3a of the vehicle 3 are covered by the ultrasonic sensors 11' provided on both sides, and the long-distance area within the width 3a of the vehicle 3 is covered by the ultrasonic sensor 11' provided at the center.

Furthermore, an ultrasonic sensor 11' has been proposed in which the orientation angle of ultrasonic waves is adjusted by forming an inclined surface by beveling the periphery of the opposite surface 22b of the acoustic matching layer 22 of the ultrasonic microphone 2' (for example, see Patent document 3). As the magnitude of the beveling performed on the periphery of the surface 22b of the acoustic matching layer 22 increases, the orientation angle of ultrasonic waves increases. In contrast, as the magnitude of the beveling decreases, the orientation angle of ultrasonic waves decreases. As described above, the orientation angle of the ultrasonic waves can be adjusted by changing the magnitude of the beveling performed on the periphery of the surface 22b of the acoustic matching layer 22. Accordingly, when the ultrasonic sensor 11' is mounted on the vehicle 3, the orientation angle of ultrasonic waves can be adjusted to prevent the area outside the width 3a of the vehicle 2 or a road surface from being detected.

Furthermore, an ultrasonic sensor 11' has been proposed in which the thickness of opposite end portions of the acoustic matching layer 22 of the ultrasonic microphone 2' in one direction is thinner than that of the center thereof and the thickness in the other direction is uniform, so that the orientation angles of ultrasonic waves in horizontal and vertical directions are adjusted (for example, see Patent document 4). The thicknesses of the acoustic matching layer 22 are set as described above, so that the orientation angle of ultrasonic waves in one direction is made narrow and the orientation angle of the ultrasonic waves in the other direction is made wide. Furthermore, the ultrasonic microphone 2' is provided on the bumper 31 so that the one direction becomes the vertical direction of the vehicle 3 and the other direction becomes the horizontal direction of the vehicle 3, and the area within the width 3a of the vehicle 3 in the horizontal direction is detected in the other direction having a wide orientation angle. Furthermore, since the area in the vertical direction is detected in the one direction having a narrow orientation angle, the road surface can be prevented from being detected.

As described above, the ultrasonic sensors disclosed in Patent documents 2 to 4 are configured to set detection areas in such a way as to adjust the detection distance or orientation angle of ultrasonic waves, thereby preventing the area outside of the width 3a of the vehicle 3 or the road surface from being detected.

(Patent document 1) Japanese Patent No. 2651140
(Patent document 2) Japanese Patent Publication No. H3-42635
(Patent document 3) Japanese Patent Application Publication No. S64-85000
(Patent document 4) Japanese Patent Application Publication No. 2003-163995

However, in accordance with the above-described conventional ultrasonic sensor, when the outside surface of the bumper 31 is arcuate or inclined, the direction in which ultrasonic waves are transmitted deviates from the longitudinal direction 3b of the vehicle 3.

FIGS. 11A and 11B illustrate detection areas when the bumper 31 is arcuate in the horizontal direction of the vehicle 3. FIG. 11A is detection areas Ah in the horizontal direction, and FIG. 11B is a detection area Av in the vertical direction.

As shown in FIG. 11A, in the horizontal direction of the vehicle 3, the outside surface of the portion of the bumper 31 where the ultrasonic sensor 11' is installed is inclined at an angle α with respect to the transverse direction 3c of the vehicle 3 that is perpendicular to the longitudinal direction 3b thereof. As described above, when the ultrasonic sensor 11' is installed such that the front surface 11a of the ultrasonic sensor 11 and the outside surface of the bumper 31 are parallel to each other, the direction H in which ultrasonic waves are transmitted is laterally inclined at an angle α with respect to the longitudinal direction 3b of the vehicle 3 in the horizontal direction. As a result, areas outside the width 3a of the vehicle are included in the detection areas Ah in the horizontal direction, and therefore the defect of detecting an obstacle that would not collide with the vehicle and providing an unnecessary notification to the user occurs. Furthermore, the direction H in which ultrasonic waves are transmitted is laterally inclined with respect to the longitudinal direction 3b of the vehicle 3 and, therefore, behind the vehicle 3, there is a gap between the two detection areas Ah of the ultrasonic microphone 2' in the horizontal direction, so that there is an area where an obstacle cannot be detected.

Furthermore, when the ultrasonic sensor 11' is installed into the bumper 31 that is arcuate or inclined with respect to the vertical direction of the vehicle 3, the direction in which ultrasonic waves are transmitted is downwardly or upwardly inclined with respect to the longitudinal direction 3b of the vehicle 3.

FIGS. 12A and 12B illustrate detection areas when the bumper 31 is arcuate in the vertical direction of the vehicle 3. FIG. 12A is detection areas Ah in the horizontal direction, and FIG. 12B is a detection area Av in the vertical direction.

As shown in FIG. 12B, in the vertical direction of the vehicle 3, the outside surface of the portion of the bumper where the ultrasonic sensor 11' is installed is downwardly inclined at an angle β with respect to the vertical direction 3c of the vehicle 3. As described above, when the ultrasonic sensor 11' is installed such that the front surface 11a of the ultrasonic sensor 11 and the outside surface of the bumper 31 are parallel to each other, the direction V in which ultrasonic waves are transmitted is downwardly inclined at an angle β with respect to the longitudinal direction 3b of the vehicle 3 in the vertical direction. As a result, a road surface is included in the detection area Av in the vertical direction, and therefore the defect of providing an unnecessary notification to the user occurs.

Accordingly, when the conventional ultrasonic sensor 11' is installed on the bumper 31 which is inclined at an angle α, the direction in which the ultrasonic sensor 11' is installed is adjusted so that the front surface 11a of the ultrasonic sensor 11 is perpendicular to the longitudinal direction 3b, thereby overcoming the above problem. FIGS. 13A to 13C illustrate schematic configurations when the conventional ultrasonic sensor 11' is installed onto the inclined bumper 31. FIG. 13A is a plan view of the ultrasonic sensor 11', FIG. 13B is a sectional view showing section A-A' of the ultrasonic sensor 11', and FIG. 13C is a sectional view showing section B-B' of the ultrasonic sensor 11'.

However, when the ultrasonic sensor 11' is installed as described above, the front surface 11a of the ultrasonic sensor 11 and the outside surface of the bumper 31 are not parallel to each other, as shown in FIG. 13B. Furthermore, the thickness of the flange part 113c of the housing 113 increases in the direction from A to A', and therefore the extent of the protrusion of the ultrasonic sensor 11' with respect to the bumper 31 increases. Accordingly, the ultrasonic sensor 11' is noticeable from the bumper 31, and deteriorates the design of the bumper 31.

SUMMARY OF THE INVENTION

In view of the above, the present invention provides an ultrasonic sensor that does not deteriorate the design of a vehicle and can set detection areas where erroneous detection hardly occurs.

In accordance with an aspect of the present invention, there is provided an ultrasonic sensor for use in a vehicle obstacle detector that is provided at a mounting surface of a vehicle to detect an obstacle in a detection area by transmitting and receiving ultrasonic waves, the ultrasonic sensor including: a piezoelectric element configured to transmit and receive the ultrasonic waves by using vibrations of a piezoelectric substrate; and an acoustic matching layer on one surface of which the piezoelectric element is attached, wherein the ultrasonic sensor is inserted in a mounting hole formed through the mounting surface; and wherein another surface of the acoustic matching layer opposite to the one surface is inclined with respect to the one surface on which the piezoelectric element is attached, and is formed to be parallel with the mounting surface.

With such configuration, it is possible to set detection areas where erroneous detection hardly occurs without deteriorating the design of the vehicle.

Further, the opposite surface of the acoustic matching layer may be inclined in a horizontal direction of the vehicle with respect to the one surface of the acoustic matching layer on which the piezoelectric element is attached.

With such configuration, it is possible to set detection areas where erroneous detection hardly occurs without deteriorating the design of the vehicle even when the mounting surface for the ultrasonic sensor is curved or inclined in the horizontal direction.

In addition, the opposite surface of the acoustic matching layer may be inclined in a vertical direction of the vehicle with respect to the one surface of the acoustic matching layer on which the piezoelectric element is attached.

With such configuration, it is possible to set detection areas where erroneous detection hardly occurs without deteriorating the design of the vehicle even when the mounting surface for the ultrasonic sensor is curved or inclined in the vertical direction.

Moreover, the opposite surface of the acoustic matching layer may be inclined in horizontal and vertical directions of the vehicle with respect to the one surface of the acoustic matching layer on which the piezoelectric element is attached.

With such configuration, it is possible to set detection areas where erroneous detection hardly occurs without deteriorating the design of the vehicle even when the mounting surface for the ultrasonic sensor is curved or inclined in the horizontal and vertical directions.

As described above, in accordance with an aspect of the present invention, it is possible to set detection areas where erroneous detection hardly occurs without deteriorating the design of the vehicle.

BRIEF DESCRIPTION OF THE DRAWINGS

The objects and features of the present invention will become apparent from the following description of embodiments, given in conjunction with the accompanying drawings, in which:

FIGS. 1A to 1C are diagrams showing the schematic configuration of an ultrasonic microphone according to a first embodiment of the present invention, wherein FIG. 1A is a plan view of the ultrasonic microphone, FIG. 1B is a sectional view showing section A-A' of the ultrasonic microphone, and FIG. 1C is a sectional view showing section B-B' of the ultrasonic microphone;

FIGS. 2A to 2C are diagrams showing the schematic configuration of an ultrasonic sensor having the ultrasonic microphone according to the first embodiment of the present invention, wherein FIG. 2A is a plan view of the ultrasonic sensor, FIG. 2B is a sectional view showing section A-A' of the ultrasonic sensor, and FIG. 2C is a sectional view showing section B-B' of the ultrasonic sensor;

FIGS. 3A and 3B are diagrams showing the block configuration of a vehicle obstacle detector and the detection areas of the ultrasonic sensor according to the first embodiment of the present invention, wherein FIG. 3A is a plan view of a vehicle showing the block configuration of the vehicle obstacle detector and detection areas Ah in the horizontal direction, and FIG. 3B is a side view of the vehicle showing a detection area Av in the vertical direction;

FIGS. 4A to 4C are diagrams showing the schematic configuration of an ultrasonic microphone according to a second embodiment of the present invention, wherein FIG. 4A is a plan view of the ultrasonic microphone, FIG. 4B is a sectional view showing section A-A' of the ultrasonic microphone, and FIG. 4C is a sectional view showing section B-B' of the ultrasonic microphone;

FIGS. 5A to 5C are diagrams showing the schematic configuration of an ultrasonic sensor having the ultrasonic microphone according to the first embodiment of the present invention, wherein FIG. 5A is a plan view of the ultrasonic sensor, FIG. 5B is a sectional view showing section A-A' of the ultrasonic sensor, and FIG. 5C is a sectional view showing section B-B' of the ultrasonic sensor;

FIGS. 6A to 6C are diagrams showing the schematic configuration of an ultrasonic microphone according to a third embodiment of the present invention, wherein FIG. 6A is a plan view of the ultrasonic microphone, FIG. 6B is a sectional view showing section A-A' of the ultrasonic microphone, and FIG. 6C is a sectional view showing section B-B' of the ultrasonic microphone;

FIGS. 7A to 7C are diagrams showing the schematic configuration of an ultrasonic sensor having the ultrasonic microphone according to the third embodiment of the present invention, wherein FIG. 7A is a plan view of the ultrasonic sensor, FIG. 7B is a sectional view showing section A-A' of the ultrasonic sensor, and FIG. 7C is a sectional view showing section B-B' of the ultrasonic sensor;

DETAILED DESCRIPTION OF THE PREFERRED EMBODIMENTS

Figure 1A:
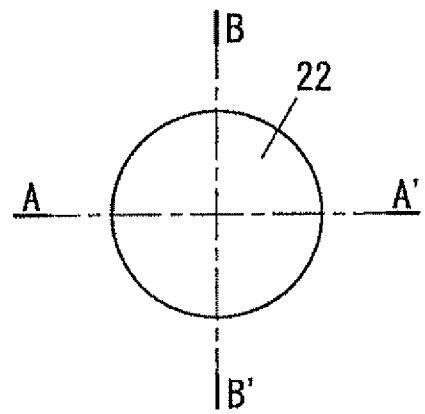

Embodiments of the present invention will now be described with reference to the accompanying drawings. In the drawings, the same or similar components are assigned by like reference numerals and redundant descriptions thereof will be omitted.

First Embodiment

The first embodiment of the present invention will be described with reference to FIGS. 1A to 1C, FIGS. 2A to 2C, and FIGS. 3A and 3B.

Figure 3A:
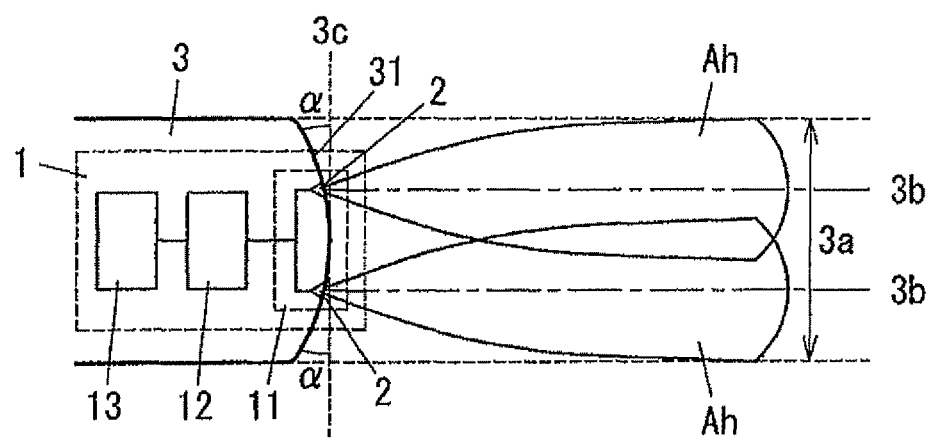
Figure 3B:
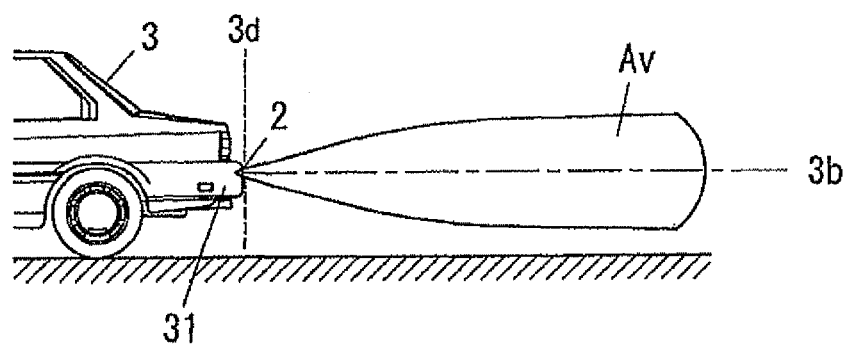
Figure 4A:
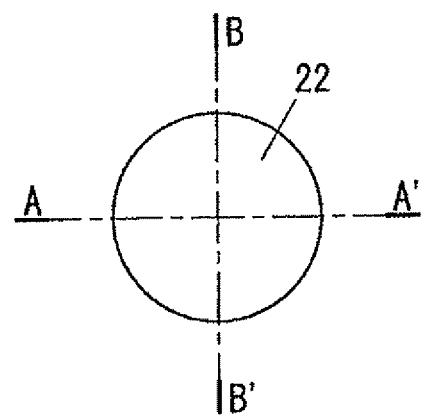
Figure 4B:
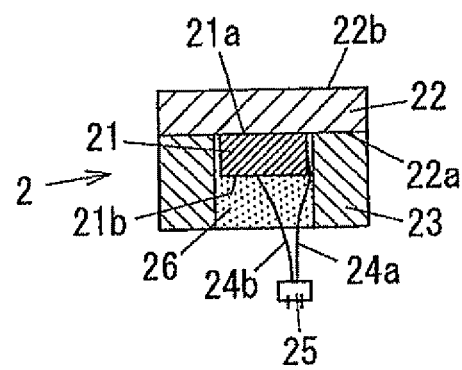
Figure 4C:
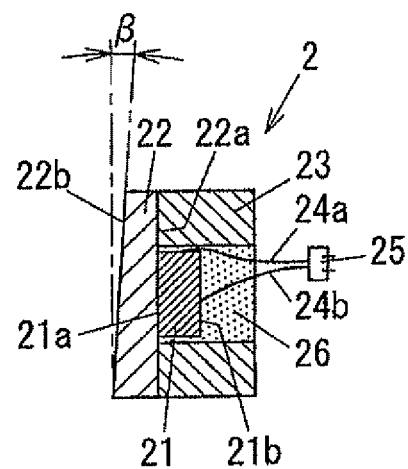
Figure 5A:
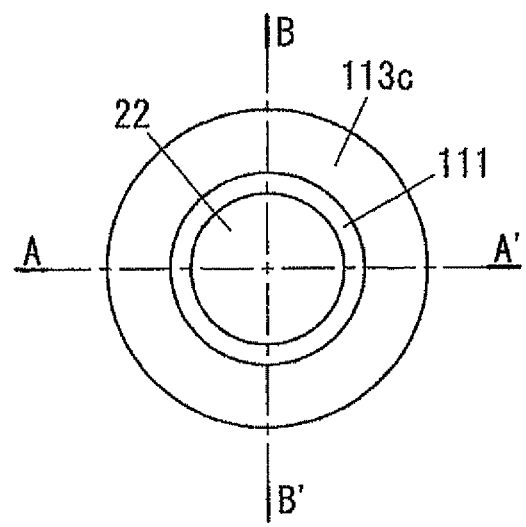
Figure 5B:
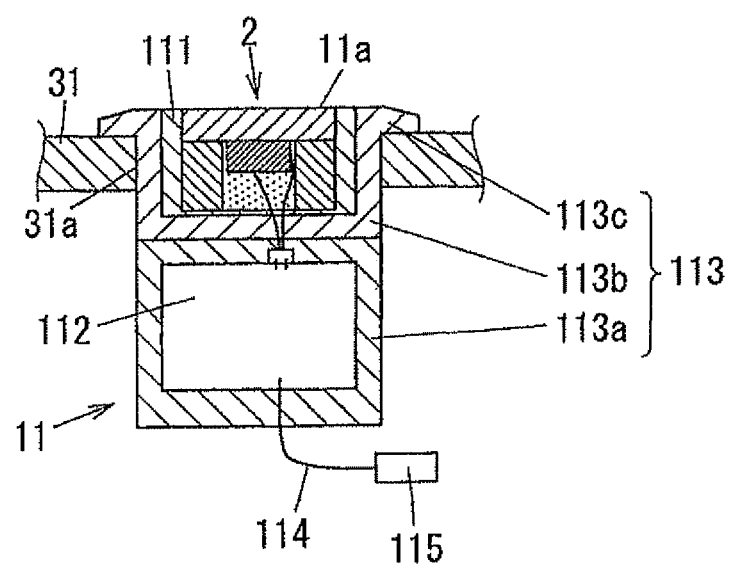
Figure 5C:
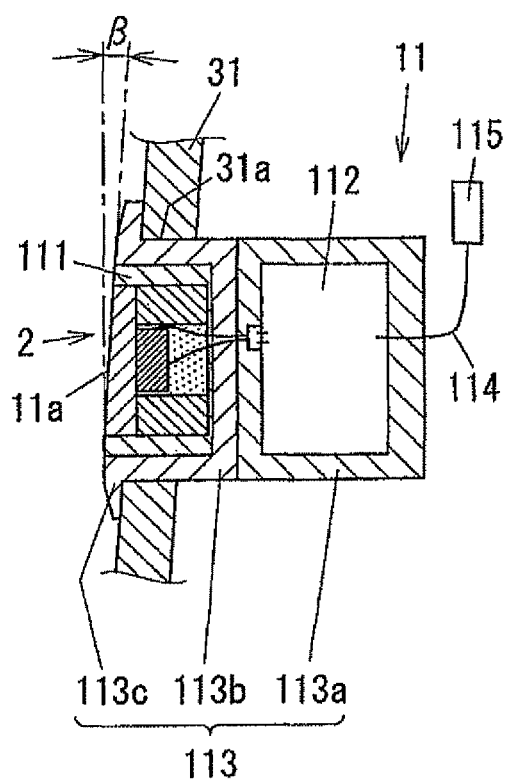
Figure 6A:
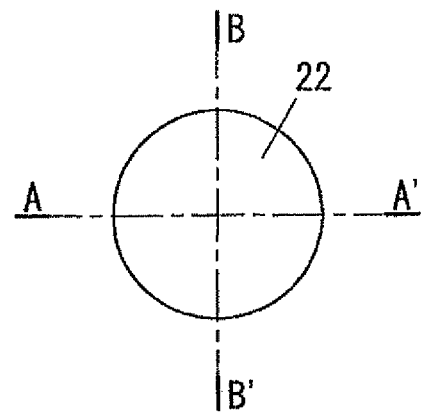
Figure 6B:
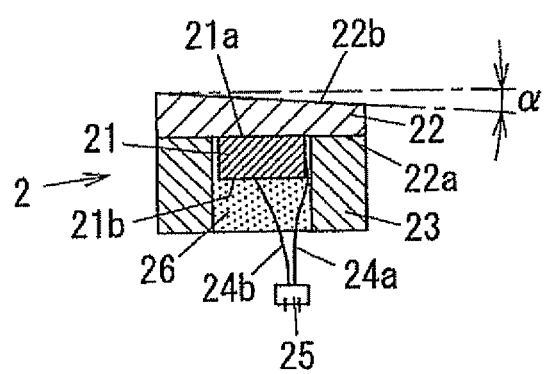
Figure 6C:
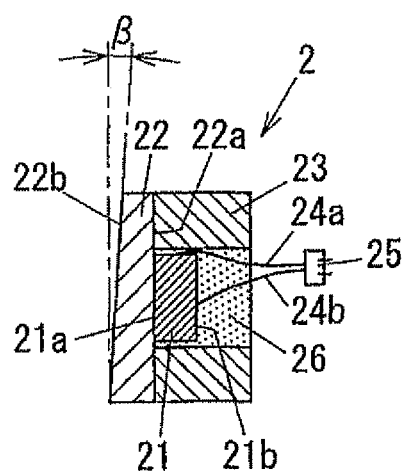
Figure 7A:
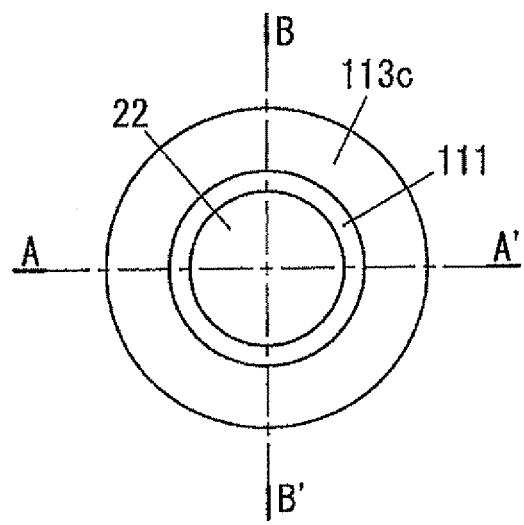
Figure 7B:
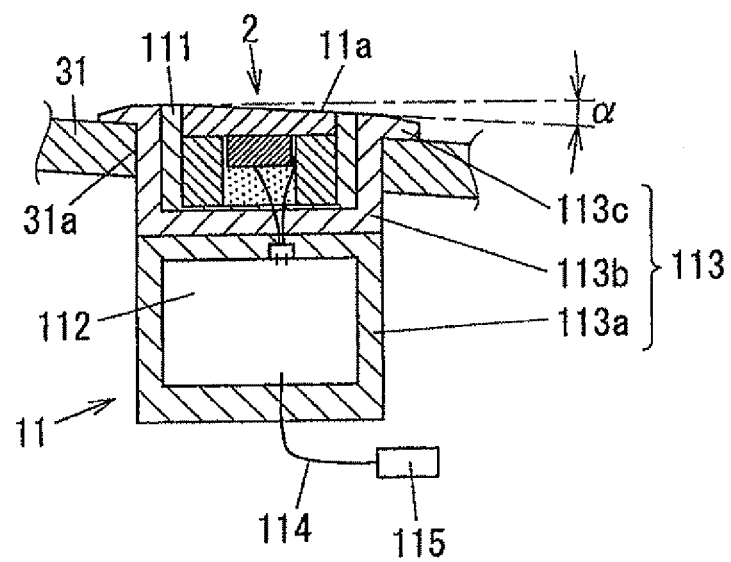
Figure 7C:
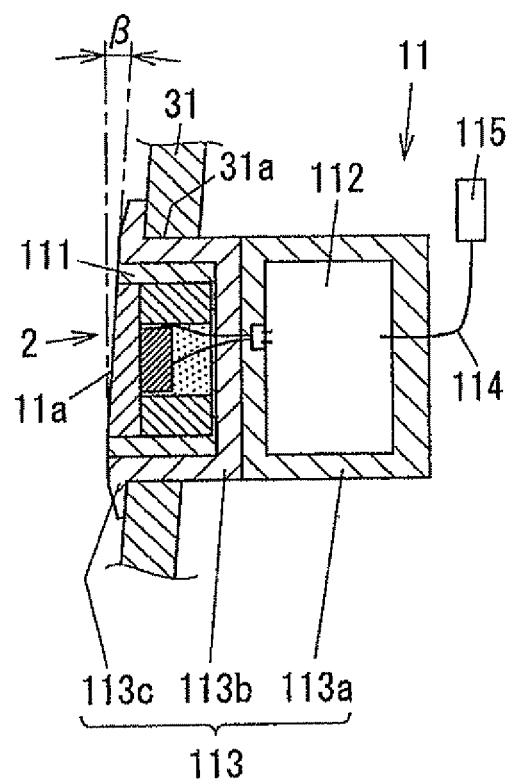
Figure 8A:
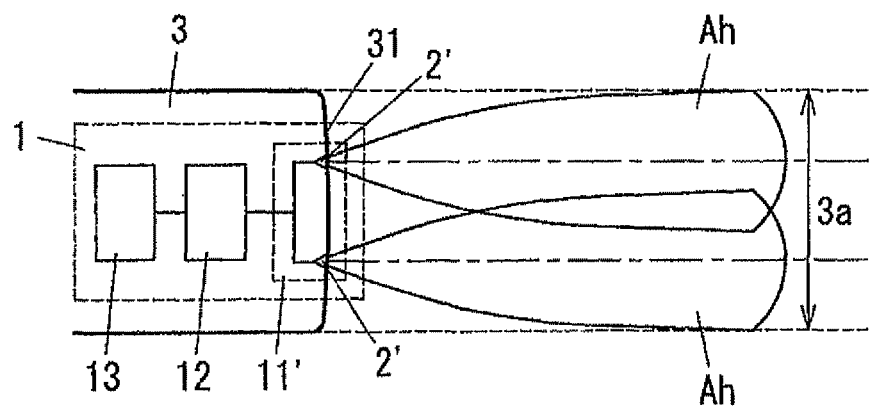
FIGS. 8A and 8B are diagrams showing the block configuration of a vehicle obstacle detector and the detection areas of a conventional ultrasonic sensor.
Figure 8B:
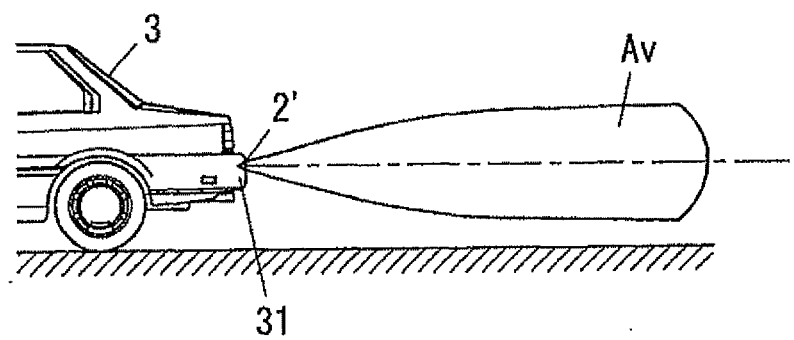
Figure 9A:
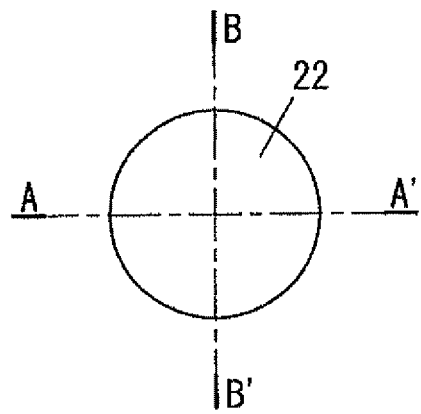
FIGS. 9A to 9C are diagrams the top and sections of a conventional ultrasonic microphone.
Figure 9B:
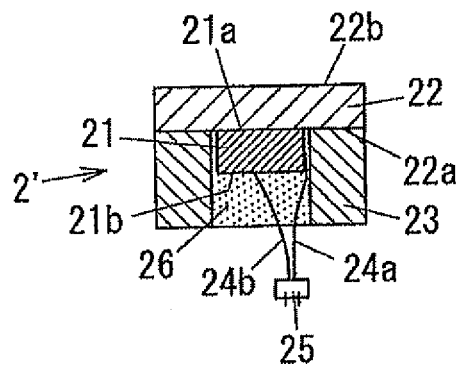
Figure 9C:
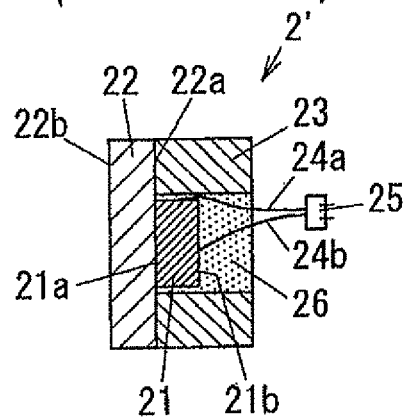
Figure 10A:
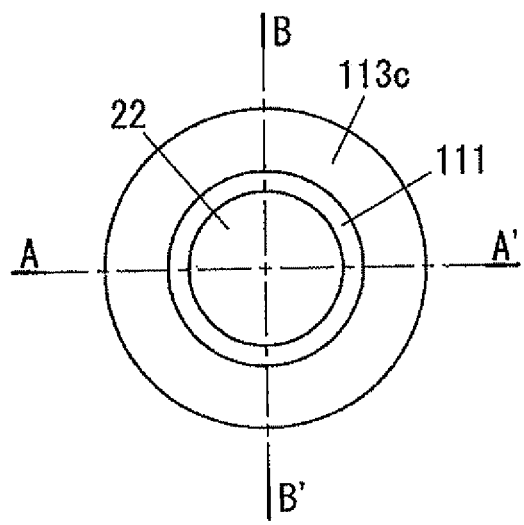
FIGS. 10A to 10C are diagrams the top and sections of the conventional ultrasonic sensor.
Figure 10B:
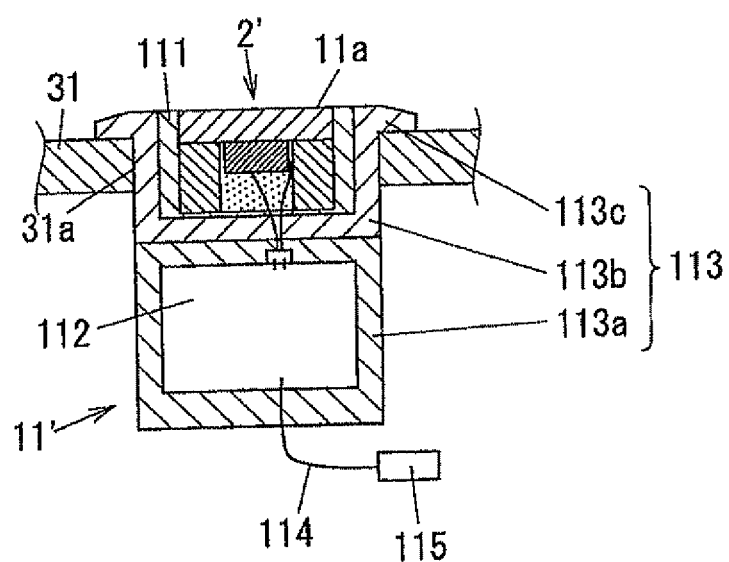
Figure 10C:
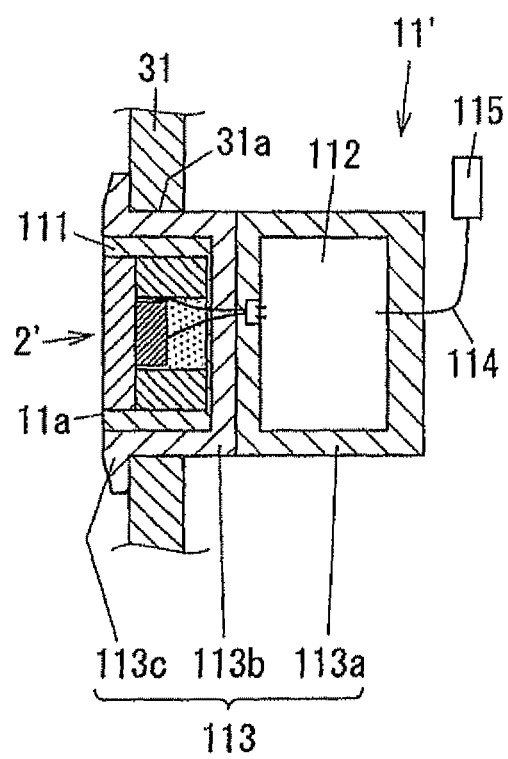
Figure 11A:
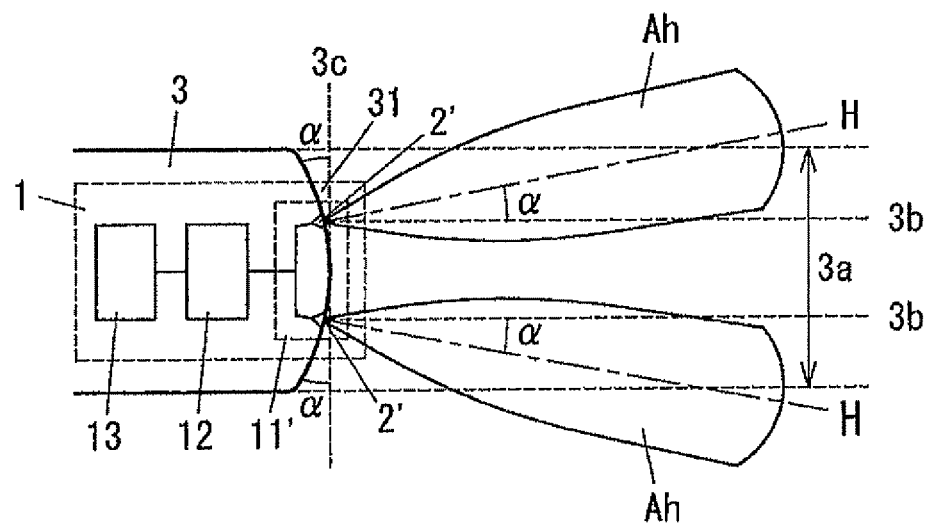
FIGS. 11A and 11B are diagrams showing the block configuration of the vehicle obstacle detector and the detection areas of the conventional ultrasonic sensor.
Figure 11B:
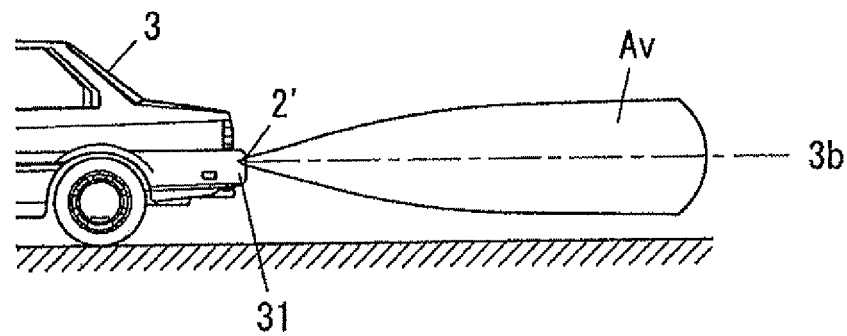
Figure 12A:
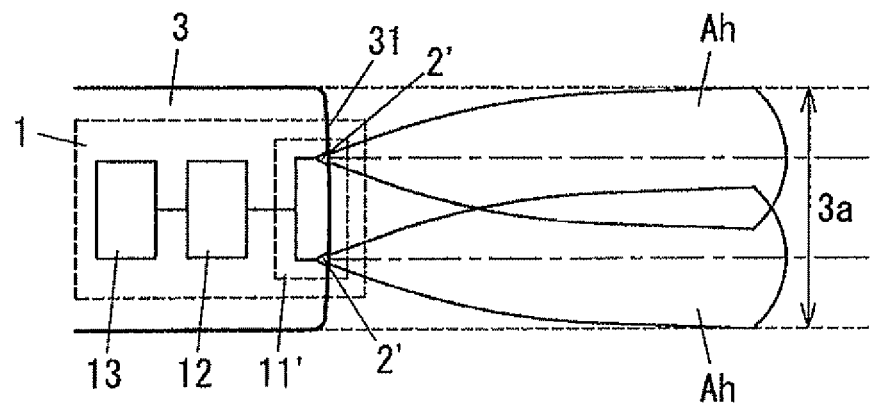
FIGS. 12A and 12B are diagrams showing the block configuration of a vehicle obstacle detector and the detection areas of a conventional ultrasonic sensor.
Figure 12B:
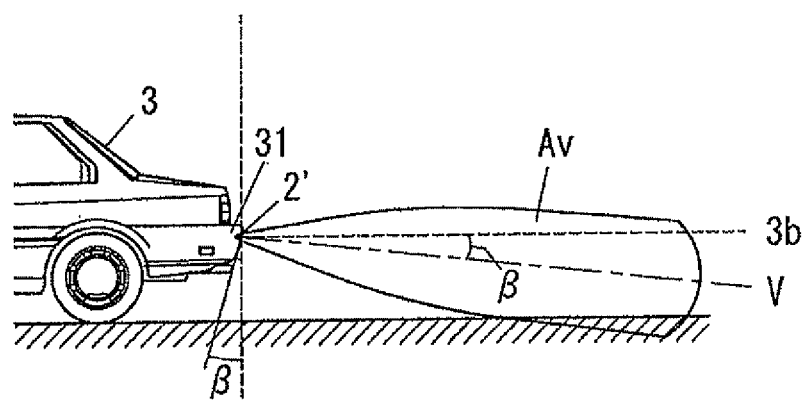
Figure 13A:
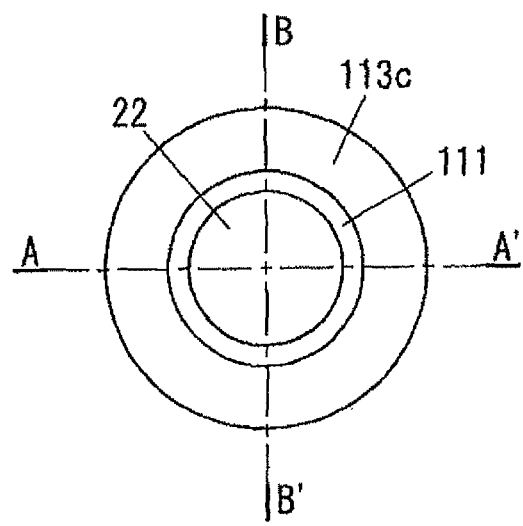
FIGS. 13A to 13C are diagrams the top and sections of the conventional ultrasonic sensor.
Figure 13B:
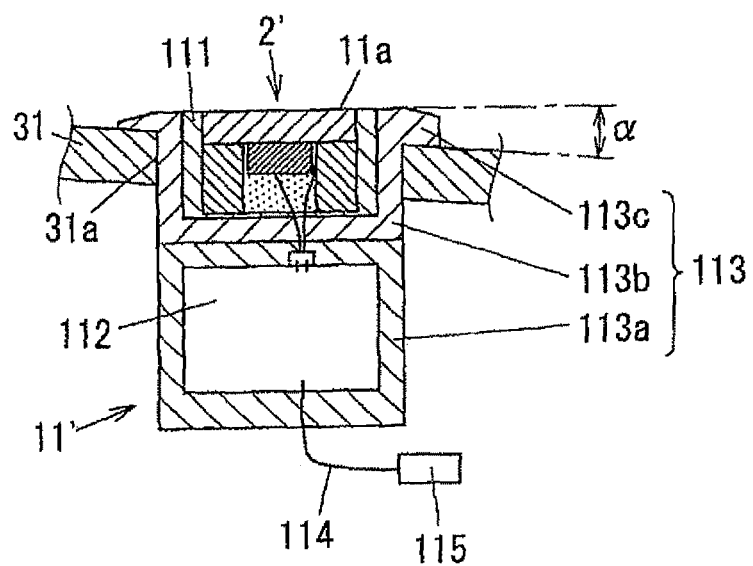
Figure 13C:
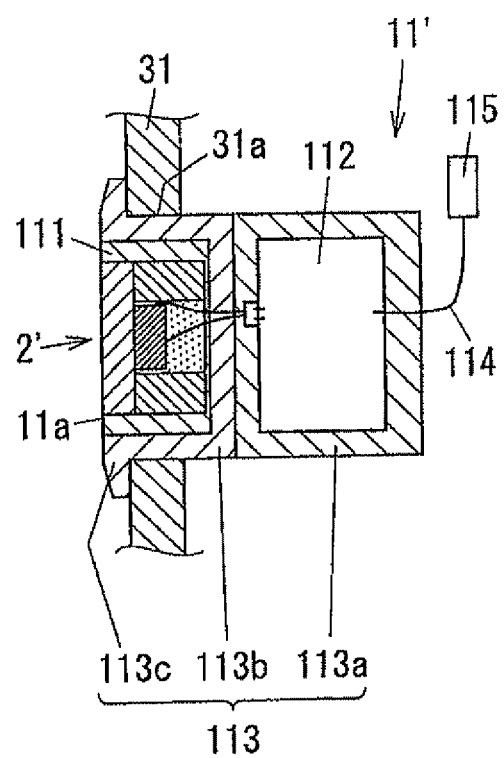

The present embodiment is directed to a case where an ultrasonic sensor 11 is installed on a bumper 31 which is arcuate in the horizontal direction, as shown in FIG. 3A, and the present embodiment will now be described in detail. In the horizontal direction of a vehicle 3, the outside surface of the portion of a bumper 31 where the ultrasonic sensor 11 is installed is inclined at an angle $\alpha$ with respect to the transverse direction $3c$ of the vehicle 3. That is, the angle $\alpha$ is the angle that is formed by the transverse direction $3c$ and the tangent line that is one of the tangent lines of the bumper 31 to which the sensor 11 is attached and that forms a plane along with the transverse direction $3c$. Furthermore, the basic configuration of a vehicle obstacle detector 1 including the ultrasonic sensor 11, a controller unit 12 and a display unit 13 is the same as that of the conventional vehicle obstacle detector 1. The same reference numerals will be assigned to the same components, and redundant descriptions thereof will be omitted.

Figure 1B:
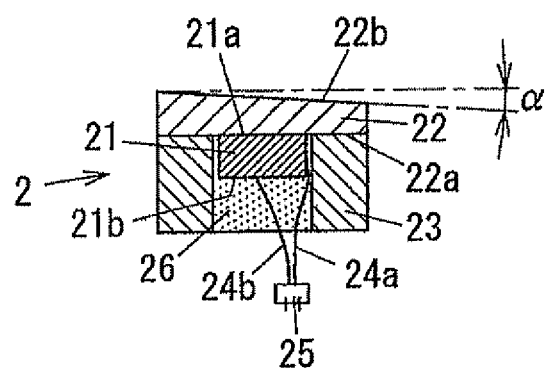
Figure 1C:
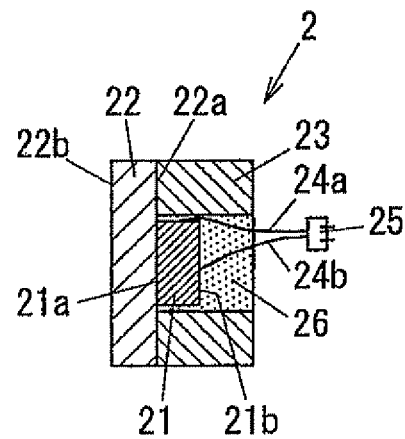

The ultrasonic microphone 2 of the present embodiment, as shown in FIGS. 1A to 1C, includes a piezoelectric element 21, an acoustic matching layer 22, a vibration casing 23, lead wires 24a and 24b, a connector 25, and a filler 26. The ultrasonic microphone 2 of the present embodiment is different from the conventional ultrasonic microphone 2' in that the shapes of the acoustic matching layers 22 are different from each other. The other components of the ultrasonic microphone 2 of the present embodiment are the same as those of the conventional ultrasonic microphone 2', so that the same reference numerals will be assigned to these components and redundant descriptions thereof will be omitted.

In the section A-A' shown in FIG. 1B, with respect to one surface 22a of the acoustic matching layer 22 on which the piezoelectric element 21 is attached, the opposite surface 22b is inclined at an angle $\alpha$ so that the opposite surface 22b approaches the one surface 22a along the direction from A to A'. This angle α is designed to be equal to the angle at which the bumper 31 is inclined.

In accordance with the above configuration, in the ultrasonic microphone 2, when an ultrasonic wave pulse signal is input via the connector 25, the piezoelectric element 21 vibrates, and ultrasonic waves are output from the opposite surface 22b of the acoustic matching layer 22 via the acoustic matching layer 22. Furthermore, ultrasonic waves are transmitted in the direction perpendicular to the one surface 21a of the piezoelectric element 21 that is attached to the acoustic matching layer 22. Accordingly, the direction perpendicular to the opposite surface 22b of the acoustic matching layer 22 is inclined at the angle α with respect to the direction in which ultrasonic waves are transmitted.

Figure 2A:
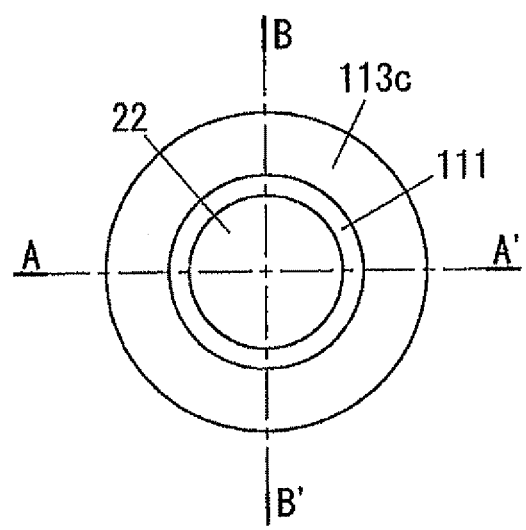
Figure 2B:
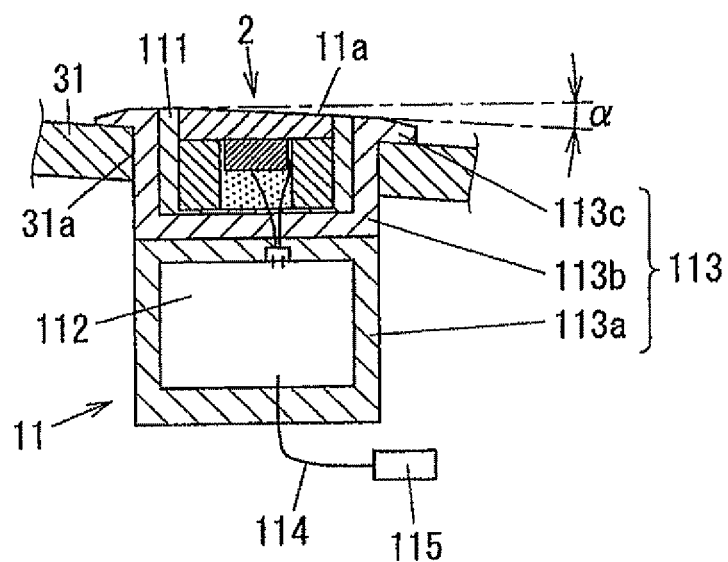
Figure 2C:
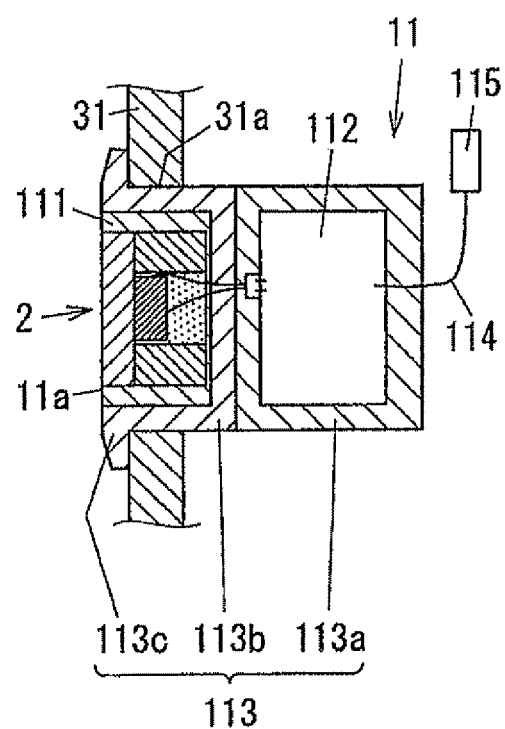

The ultrasonic sensor 11, as shown in FIGS. 2A to 2C, includes the ultrasonic microphone 2, a holding rubber 111, an electronic circuit unit 112, a housing 113, a signal line 114, and a connector 115. The ultrasonic sensor 11 is different from the conventional ultrasonic sensor 11' in that the shapes of the ultrasonic microphone 2, the holding rubber 111 and the housing 113 are different from each other. The other components of the ultrasonic sensor 11 are the same as those of the conventional ultrasonic sensor 11', so that the same reference numerals will be assigned to these components and redundant descriptions thereof will be omitted.

The peripheries of the openings of the holding rubber 111 and the front housing part 113b are inclined in conformity with the inclined angle α of the opposite surface 22b of the acoustic matching layer 22 so that the front surface 11a of the ultrasonic sensor 11, which is formed by the opposite surface 22b of the acoustic matching layer 22 of the ultrasonic microphone 2, the periphery of the opening of the holding rubber 111 and the flange part 113c of the housing 113, can form a single smooth surface.

The ultrasonic sensor 11 is inserted into the mounting hole 31a of the bumper 31 so that direction A-A' of the ultrasonic microphone 2 becomes the transverse direction 3c of the vehicle 3 (that is, the one surface 22a of the acoustic matching layer 22 is parallel with the transverse direction 3c of the vehicle 3), and the ultrasonic sensor 11 is held on the bumper 31 by the flange part 113c of the housing 113. Consequently, the direction perpendicular to the one surface 21a of the piezoelectric element 21 is consistent with the longitudinal direction 3b of the vehicle 3, so that the direction in which ultrasonic waves are transmitted becomes the longitudinal direction of the vehicle 3, as shown in FIG. 3A.

Furthermore, since the front surface 11a of the ultrasonic sensor 11 and the outside surface of the bumper 31 are all inclined at the same angle α with respect to the transverse direction 3c, the front surface 11a of the ultrasonic sensor 11 and the outside surface of the bumper 31 are parallel to each other. Furthermore, only the flange part 113c of the ultrasonic sensor 11 protrudes from the outside surface of the bumper 31 with the thickness of the flange part 113c kept small and uniform. For this reason, the ultrasonic sensor 11 is not noticeable from the bumper 31, and does not deteriorate the design of the bumper 31.

In accordance with the above-described configuration, even when the bumper 31 is inclined at an angle α with respect to the transverse direction 3c, the direction in which ultrasonic waves are transmitted can be set to the longitudinal direction 3b of the vehicle without deteriorating the design of the bumper 31. For this reason, an area outside the width 3a of the vehicle is not included in a detection area Ah in the horizontal direction, so that the defect of detecting an obstacle that would not collide with the vehicle and then providing an unnecessary notification to the user can be prevented.

Second Embodiment

A second embodiment of the present invention will be described with reference to FIGS. 4A to 4C and FIGS. 5A to 5C.

The present embodiment is directed to a case where an ultrasonic sensor 11 is installed on a bumper 31 which is arcuate in the vertical direction 3d, which will be described in detail below. The outside surface of the portion of the bumper 31 where the ultrasonic sensor 11 is installed is inclined at an angle β with respect to the vertical direction 3d of the vehicle 3. That is, the angle β is the angle that is formed by the vertical direction 3d and a tangent line which is one of the tangent lines of the bumper 31 to which a sensor 11 is attached and which forms a plane along with the vertical direction 3d.

As shown in FIGS. 4A to 4C and FIG. 5A to 5C, the basic configurations of the ultrasonic microphone 2 and ultrasonic sensor 11 of the present embodiment are the same as those of the first embodiment, so that the same reference numerals will be assigned to these components and redundant descriptions thereof will be omitted.

The present embodiment is different from the first embodiment in that since the ultrasonic microphone 2 of the present embodiment is installed into the bumper 31 that is inclined at an angle β with respect to the vertical direction 3d of the vehicle 3, the opposite surface 22b of the acoustic matching layer 22 of the ultrasonic microphone 2 is inclined in the direction B-B' (that is, inclined so that the vertical direction of the opposite surface 22b of the acoustic matching layer 22 forms an angle β with respect to the vertical direction 3d of the vehicle 3). As in the first embodiment, in the section B-B' shown in FIG. 4C, with respect to one surface 22a of the acoustic matching layer 22 on which the piezoelectric element 21 is attached, the opposite surface 22b is inclined at an inclined angle β so that the opposite surface 22b approaches the one surface 22a along the direction from B' to B. Since ultrasonic waves are transmitted toward the direction perpendicular to one surface 21a of the piezoelectric element 21 that is attached to the acoustic matching layer 22, the direction perpendicular to the opposite surface 22b of the acoustic matching layer 22 is inclined at the angle α with respect to the direction in which ultrasonic waves are transmitted.

Furthermore, the peripheries of the openings of the holding rubber 111 and the front housing part 113b are inclined in conformity with the inclined angle β of the opposite surface 22b of the acoustic matching layer 22 so that in the ultrasonic sensor 11 having the ultrasonic microphone 2, the front surface 11a of the ultrasonic sensor 11, which is formed by the opposite surface 22b of the acoustic matching layer 22, the periphery of the opening of the holding rubber 111 and the flange part 113c of the housing 113, can form a single smooth surface.

The ultrasonic sensor 11 is inserted into the mounting hole 31a of the bumper 31 so that the direction B-B' of the ultrasonic microphone 2 becomes the vertical direction 3c of the vehicle 3, and the ultrasonic sensor 11 is held on the bumper 31 by the flange part 113c of the housing 113. Consequently, the direction perpendicular to the one surface 21a of the piezoelectric element 21 is consistent with the longitudinal direction 3b of the vehicle 3, so that the direction in which ultrasonic waves are transmitted becomes the longitudinal direction 3b of the vehicle 3.

Furthermore, since the front surface 11a of the ultrasonic sensor 11 and the outside surface of the bumper are all inclined at the angle β with respect to the vertical direction 3*d*, the front surface 11*a* of the ultrasonic sensor 11 and the outside surface of the bumper 31 are parallel to each other. Furthermore, only the flange part 113*c* of the ultrasonic sensor 11 protrudes from the outside surface of the bumper 31 with the thickness of the flange part 113*c* kept small and uniform. For this reason, the ultrasonic sensor 11 is not noticeable from the bumper 31, and does not deteriorate the design of the bumper 31.

In accordance with the above-described configuration, even when the bumper 31 is inclined at the angle β with respect to the vertical direction 3*d*, the direction in which ultrasonic waves are transmitted can be set to the longitudinal direction 3*b* of the vehicle without deteriorating the design of the bumper 31. For this reason, a road surface is not included in a detection area Av in the vertical direction, so that the defect of providing an unnecessary notification to the user can be prevented.

Third Embodiment

A third embodiment of the present invention will now be described with reference to FIGS. 6A to 6C and FIGS. 7A to 7C.

The present embodiment is directed to a case where an ultrasonic sensor 11 is installed on a bumper 31 which are arcuate in both the horizontal and vertical directions, and the present embodiment will now be described in detail. The outside surface of the portion of the bumper 31 where the ultrasonic sensor 11 is installed is inclined at an angle α with respect to the transverse direction 3*c* of the vehicle 3 and at an angle β with respect to the vertical direction 3*d*.

As shown in FIGS. 6A to 6C and FIGS. 7A to 7C, the basic configurations of the ultrasonic microphone 2 and ultrasonic sensor 11 of the present embodiment are the same as those of the first and second embodiments, so that the same reference numerals will be assigned to these components and redundant descriptions thereof will be omitted.

The present embodiment is different from the first and second embodiments in that since the ultrasonic microphone 2 of the present embodiment is installed into the bumper 31 that is inclined at the angle α with respect to the transverse direction 3*c* and at the angle β with respect to the vertical direction 3*d*, the opposite surface 22*b* of the acoustic matching layer 22 of the ultrasonic microphone 2 is inclined in both direction A-A' and direction B-B'. As in the first and second embodiments, in the section A-A' shown in FIG. 6B, with respect to one surface 22*a* of the acoustic matching layer 22 on which the piezoelectric element 21 is attached, the opposite surface 22*b* is inclined at the inclined angle α so that the opposite surface 22*b* approaches the one surface 22*a* along the direction from A to A'. Furthermore, in the section B-B' shown in FIG. 6C, the opposite surface 22*b* of the acoustic matching layer 22 is inclined at an inclined angle β so that the opposite surface 22*b* approaches the one surface 22*a* along the direction from B' to B. Since ultrasonic waves are output and transmitted toward the direction perpendicular to one surface 21*a* of the piezoelectric element 21 that is attached to the acoustic matching layer 22, the direction perpendicular to the opposite surface 22*b* of the acoustic matching layer 22 is inclined at the angle α in the horizontal direction and at the angle β in the vertical direction with respect to the direction in which ultrasonic waves are transmitted.

Furthermore, in the ultrasonic sensor 11 having the ultrasonic microphone 2, the peripheries of the openings of the holding rubber 111 and the front housing part 113*b* are inclined in conformity with the inclined angles α and β of the opposite surface 22*b* of the acoustic matching layer 22 so that the front surface 11*a* of the ultrasonic sensor 11, which is formed by the opposite surface 22*b* of the acoustic matching layer 22, the periphery of the opening of the holding rubber 111 and the flange part 113*c* of the housing 113, can form a single smooth surface.

The ultrasonic sensor 11 is inserted into the mounting hole 31*a* of the bumper 31 so that direction A-A' of the ultrasonic microphone 2 becomes the horizontal direction of the vehicle 3 and direction B-B' of the ultrasonic microphone 2 becomes the vertical direction of the vehicle 3, and the ultrasonic sensor 11 is held on the bumper 31 by the flange part 113*c* of the housing 113. Consequently, the direction perpendicular to the one surface 21*a* of the piezoelectric element 21 is consistent with the longitudinal direction 3*b* of the vehicle 3, so that the direction in which ultrasonic waves are transmitted becomes the longitudinal direction 3*b* of the vehicle 3.

Furthermore, since the front surface 11*a* of the ultrasonic sensor 11 and the outside surface of the bumper are all inclined at the angle α with respect to the transverse direction 3*c* and at the angle β with respect to the vertical direction 3*d*, the front surface 11*a* of the ultrasonic sensor 11 and the outside surface of the bumper 31 are parallel to each other. Furthermore, only the flange part 113*c* of the ultrasonic sensor 11 protrudes from the outside surface of the bumper 31 with the thickness of the flange part 113*c* kept small and uniform. For this reason, the ultrasonic sensor 11 is not noticeable from the bumper 31, and does not deteriorate the design of the bumper 31.

In accordance with the above-described configuration, even when the bumper 31 is inclined at the angle α with respect to the transverse direction 3*c* and at the angle β with respect to the vertical direction 3*d*, the direction in which ultrasonic waves are transmitted can be set to the longitudinal direction 3*b* of the vehicle without deteriorating the design of the bumper 31. For this reason, an area outside the width 3*a* of the vehicle is not included in a detection area Ah in the horizontal direction and a road surface is not included in a detection area Av in the vertical direction, so that the defect of detecting an obstacle that would not collide with the vehicle and then providing an unnecessary notification to the user can be prevented.

While the invention has been shown and described with respect to the embodiments, it will be understood by those skilled in the art that various changes and modification may be made without departing from the scope of the invention as defined in the following claims.

What is claimed is:

1. An ultrasonic sensor for use in a vehicle obstacle detector configured to be provided at a mounting surface of a vehicle to detect an obstacle in a detection area by transmitting and receiving ultrasonic waves, the ultrasonic sensor comprising:
    an ultrasonic microphone which includes:
        a piezoelectric element configured to transmit and receive the ultrasonic waves; and
        an acoustic matching layer including a first and a second surface disposed opposite to each other, the piezoelectric element being attached to the first surface;
    a cylindrical holding rubber which accommodates and holds the ultrasonic microphone; and
    a housing which accommodates the ultrasonic microphone and the cylindrical holding rubber, the housing being configured to be inserted in a mounting hole which is formed through the mounting surface, wherein the housing includes:
- a cylindrical front housing part including an inner surface and an opening; and
- a flange part protruding from a periphery of the opening in an outward radial direction, wherein an outer surface of the cylindrical holding rubber is in contact with the inner surface of the cylindrical front housing part, wherein the flange part is configured to be in contact with the mounting surface when the housing is inserted in the mounting hole, wherein the second surface is configured to be parallel with the mounting surface when the housing is inserted in the mounting hole, and wherein the second surface is inclined with respect to the first surface in horizontal and vertical directions.

2. The ultrasonic sensor of claim 1, wherein the cylindrical holding rubber further includes an opening into which the ultrasonic microphone is inserted, and wherein the second surface, a periphery of the opening of the cylindrical holding rubber, and the flange part flush with each other to form a single surface.

3. The ultrasonic sensor of claim 2, wherein the ultrasonic sensor is configured to be held on the mounting surface by the flange part of the housing.

4. The ultrasonic sensor of claim 1, wherein the ultrasonic sensor is configured to be held on the mounting surface by the flange part of the housing.

* * * * *